UNITED STATES PATENT OFFICE.

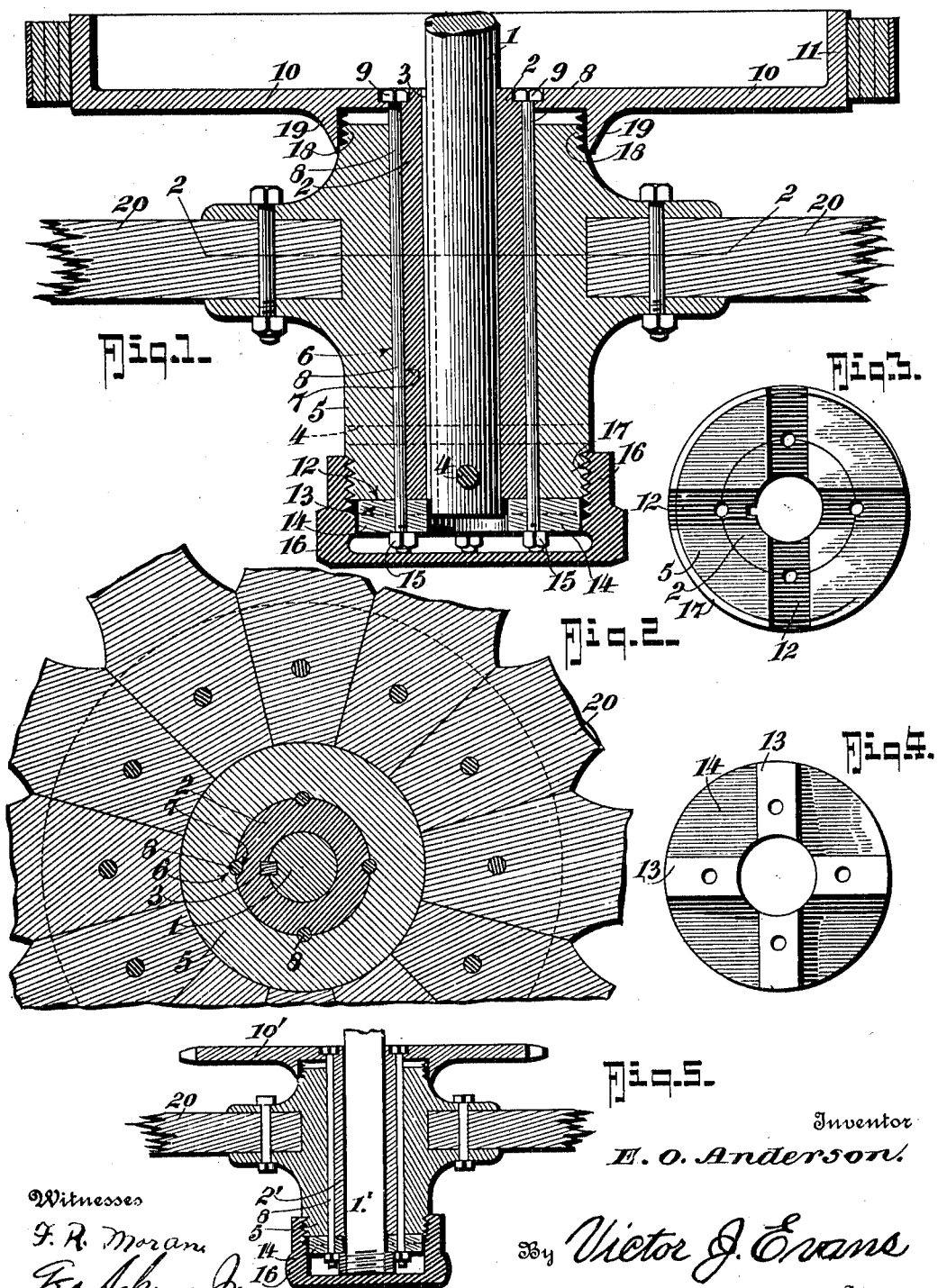

ELI O. ANDERSON, OF GLENWOOD, FLORIDA.

CHANGEABLE TREAD FOR AUTOMOBILES.

1,096,818. Specification of Letters Patent. Patented May 19, 1914.

Application filed August 15, 1913. Serial No. 784,999.

*To all whom it may concern:*

Be it known that I, ELI O. ANDERSON, a citizen of the United States, residing at Glenwood, in the county of Volusia and State of Florida, have invented new and useful Improvements in Changeable Treads for Automobiles, of which the following is a specification.

This invention relates to means for changing the tread of automobiles and other motor driven vehicles, the object of the invention being to produce a novel construction of wheel and mounting therefor whereby the tread of the machine may be quickly changed by removing and reversing the wheels with relation to their axles or shafts, the construction hereinafter described providing for an easy reversal of the wheels and their hubs relatively to the axles by which they are carried.

With the above and other objects in view, the invention consists in the construction, combination and arrangement of parts, as will hereinafter be more fully described, illustrated and claimed.

In the accompanying drawings: Figure 1 is a diametrical section through a wheel hub embodying the present invention as shown applied to one of the driving wheels of the machine. Fig. 2 is a cross section through the same on the line 2—2 of Fig. 1. Fig. 3 is an end elevation of the hub showing the locking grooves. Fig. 4 is a detail view of said washer. Fig. 5 is a view similar to Fig. 1 showing the invention as applied to one of the front or steering wheels of the machine.

In different sections of the country the tread of a vehicle varies from 56 inches to 60 inches and this has been found very annoying to the drivers of motor cars for the reason that if the machine has a 56 inch tread, upon reaching a section of the country in which vehicles have a 60 inch tread, the ordinary tracks or ruts produce an excessive wear and tear on the machines of narrower tread besides making it exceedingly difficult to steer and control the machine.

The object of this invention is to provide means whereby the tread of the machine may be easily and quickly changed from one standard to the other and vice versa.

In carrying out the present invention, 1 designates the driving axle of an automobile around which is placed a sleeve 2 which is fastened by means of a key 3 to the axle 1 so as to rotate constantly therewith. If desired one or more pins 4 may be inserted diametrically through holes in the axle 1 and sleeve 2 as well as the hub 5 which surrounds the sleeve 2.

The wheel hub 5 is provided with internal grooves 6 extending longitudinally of the bore thereof as shown in Fig. 2 and the sleeve 2 is provided with complemental grooves 7 extending lengthwise of the outer face thereof and registering with the grooves 6. Bolts 8 are inserted through the holes thus formed by the complemental grooves 6 and 7, said bolts serving to key the hub 5 and sleeve 2 together and also tie the same together in the direction of their length, the heads 9 of the bolts 8 being inlaid in the central portion of a flange 10 formed integrally with the inner end of the sleeve 2 as shown in Fig. 1. The flange 10 is shown as constituting a part of the brake drum the rim of which is indicated at 11.

At their outer ends the sleeve 2 and hub 5 are provided with radial grooves 12 to receive the corresponding radial arms 13 of a locking washer 14 against which the nuts 15 of the bolts 8 bear. The washer 14 thus forms an additional locking device between the sleeve 2 and the hub 5 and a bearing for the nuts 15. 16 designates the usual internally threaded hub cap which fits upon the outer end of the hub, the hub being provided at its outer extremity with threads 17 to receive the cap 16 and being also provided at its inner end with other threads 18 for the same purpose when the hub is turned end for end. The threads at the inner end of the hub are protected by an annular guard or flange 19 formed on the outer face of the flange 10 as clearly shown in Fig. 1.

The spokes 20 instead of being located centrally of the outer and inner ends of the hub 5 are located, for example, one inch from the center of the hub and therefore there is a difference of two inches between the location of the spokes 20 under the two positions of the wheel hub. As this difference occurs at both sides of the machine it will thus be seen that when the wheels are reversed, a total difference of four inches will occur between the centers of the spokes of oppositely located wheels thus enabling the tread to be varied between 56 inches and 60 inches.

In applying the invention to the front steering wheels of the machine, the sleeve 2′ will be journaled to turn upon the axle 1', the key 3 above referred to being omitted as there is no necessity of keying the wheels to the front axle under the rear wheel drive at present in use in vehicles of the class referred to. The flange 10' shown in Fig. 5 as applied to the sleeve 2' of the front wheel is adapted to have the usual speedometer gear wheel attached thereto or the said flange 10' may be toothed along its periphery to form said gear wheel in itself.

From the foregoing description it will now be understood that the tread of the machine may be quickly and easily changed to conform to the section of the country being traveled over by the machine, thus adding greatly to the comfort of the passengers and materially reducing the wear and tear on the machine. To change from one tread to another, it is only necessary to remove the cap 16 and then remove the nuts 15. This permits the wheel and its hub to be detached after which it may be quickly reversed and again placed upon the sleeve 2 in proper relation to the bolts 8. The nuts 15 are then reapplied and the cap 16 screwed upon the outer extremity of the hub.

What I claim is:

1. The combination of a vehicle wheel axle, a sleeve surrounding said axle and formed with grooves extending longitudinally of the outer face thereof, an end for end reversible wheel hub formed with grooves extending longitudinally of the bore thereof and registering with the first named grooves, detachable bolts lying in said grooves to tie and key the hub and sleeve together, and spokes connected to said hub at one side of a central point between the ends of the hub.

2. The combination of a vehicle wheel axle, a sleeve surrounding said axle and keyed thereto and formed with grooves extending longitudinally of the outer face thereof, an end for end reversible wheel hub formed with grooves extending longitudinally of the bore thereof and registering with the first named grooves, detachable bolts lying in said grooves to tie and key the hub and sleeve together, a locking washer embodying radiating arms inlaid in the corresponding extremities of said hub and sleeve and having said bolts passed therethrough, and spokes connected to said hub at one side of a central point between the ends of the hub.

3. The combination of a vehicle wheel axle, a sleeve surrounding said axle and formed with grooves extending longitudinally of the outer face thereof, an end for end reversible wheel hub formed with grooves extending longitudinally of the bore thereof and registering with the first named grooves, detachable bolts lying in said grooves to tie and key the hub and sleeve together, and spokes connected to said hub at one side of a central point between the ends of the hub, both extremities of said hub being threaded to receive the hub cap.

4. The combination of a vehicle wheel axle, a sleeve surrounding said axle and formed with grooves extending longitudinally of the outer face thereof, both extremities of said hub being threaded to receive the hub cap, a wheel hub formed with grooves extending longitudinally of the bore thereof and registering with the first named grooves, detachable bolts lying in said grooves to tie and key the hub and sleeve together, a flange at the inner end of said sleeve, and an annular guard on said flange inclosing the threaded inner extremity of the hub.

In testimony whereof I affix my signature in presence of two witnesses.

ELI O. ANDERSON.

Witnesses:
RAYMOND C. WHEELER,
EMMETT P. WILSON.